(12) United States Patent
Fraenken (10) Patent No.: US 7,928,898 B2
(45) Date of Patent: Apr. 19, 2011

(54) METHOD FOR DETERMINING THE KINEMATIC STATE OF AN OBJECT, BY EVALUATING SENSOR MEASURED VALUES

(75) Inventor: Dietrich Fraenken, Ulm (DE)

(73) Assignee: EADS Deutschland GmbH, Ottobrunn (DE)

( * ) Notice: Subject to any disclaimer, the term of this patent is extended or adjusted under 35 U.S.C. 154(b) by 61 days.

(21) Appl. No.: 12/527,146

(22) PCT Filed: Jan. 1, 2008

(86) PCT No.: PCT/DE2008/000088
§ 371 (c)(1),
(2), (4) Date: Aug. 13, 2009

(87) PCT Pub. No.: WO2008/098537
PCT Pub. Date: Aug. 21, 2008

(65) Prior Publication Data
US 2010/0026556 A1   Feb. 4, 2010

(30) Foreign Application Priority Data

Feb. 14, 2007   (DE) .......................... 10 2007 007 266

(51) Int. Cl.
*G01S 13/58* (2006.01)
(52) U.S. Cl. .......................... 342/107; 342/106; 342/139
(58) Field of Classification Search ........... 342/106–107
See application file for complete search history.

(56) References Cited

OTHER PUBLICATIONS

Longbin, M. et al., "Unbiased Converted Measurements for Tracking", IEEE Transactions on Aerospace and Electronic Systems, Jul. 1, 1998, pp. 1023-1027, No. 3.*

International Search Report dated Jun. 12, 2009 with partial English translation (Six (6) pages).
Longbin, M. et al., "Unbiased Converted Measurements for Tracking", IEEE Transactions on Aerospace and Electronic Systems, Jul. 1, 1998, pp. 1023-1027, No. 3, XP009100946, ISSN:0018-9251.
Longbin, M. et al, "Unbiased Converted Measurements for Target Tracking", Aerospace and Electronics Conference, Proceedings of the IEEE, 1997, pp. 1039-1041, USA, XP010242950 ISBN: 978-0-7803-3725-1.

(Continued)

*Primary Examiner* — Thomas H Tarcza
*Assistant Examiner* — Timothy A Brainard
(74) *Attorney, Agent, or Firm* — Crowell & Moring LLP (57) ABSTRACT

In a method for determining the kinematic state of an object by evaluating a sequence of discrete polar measured values of a sensor, the polar measurements $r_m$, $\alpha_m$ are converted to Cartesian coordinates and subsequently scaled to Cartesian pseudo-measurements using a scaling factor $\beta$ calculated as a function of measured range $r_m$. Associated pseudo-measurement error variance matrices are determined, each comprising nominal measurement error variances in the range direction $R^2_m$ and transversely thereto $C^2_m$ as a function of the measured range $r_m$. The state of the object is estimated, with an estimated variance $\hat{\sigma}^2_{cross}$ being determined transversely with respect to the range direction in an estimation device, based on the Cartesian pseudo-measurements and the pseudo-measurement error variance matrices. The scaling factor $\beta$ is chosen such that no systematic error results for a position estimate comprising n>1 measurements; and the nominal pseudo-measurement error variance $R^2_m$ in the range direction is calculated as a function of the nominal pseudo-measurement error variance $C^2_m$ transversely thereto or conversely such that the variance $\hat{\sigma}^2_{cross}$ which is estimated after processing of n>1 measurements, transversely with respect to the range direction, on average matches the actual variance $\hat{\sigma}^2_{cross}$ of the estimated error transversely with respect to the range direction.

6 Claims, 4 Drawing Sheets

OTHER PUBLICATIONS

Yeom, S-W., "Improving Track Continuity Using Track Segment Association", Aerospace Conference, IEEE, Mar. 8-15, 2003, pp. 1925-1941, vol. 4, USA XP010660418, ISBN: 978-0-7803-7651-9.

Miller, M. D. et al, "Comparison of Methodologies for Mitigating Coordinate Transformation Bias in Target Tracking", Proceedings of the SPIE, Jan. 1, 2000, pp. 414-427, vol. 4048, Bellingham, VA, USA, XP009100952, ISSN:0277-786X.

Miller, M. D. et al, "Coordinate Transformation Bias in Target Tracking" Proceedings of the SPIE Conference on Signal and Data Processing on Small Targets, Jul. 1999, pp. 409-424, vol. 3809, Denver, Colorado, USA, XP009100949, ISSN: 0277-786X.

Zhao, Z. et al, "Optimal Linear Unbiased Filtering with Polar Measurements for Target Tracking" Information Fusion, Proceedings of the Fifth International Conference, Jul. 8-11, 2002, pp. 1527-1534, XP010594375, ISBN: 978-0-9721844-1-0.

Zhansheng, D. et al. "Comments On Unbiased Converted Measurements For Tracking" IEEE Transactions On Aerospace And Electronic Systems, Oct. 2004, pp. 1374-1377, vol. 40, No. 4, USA, XP009100948, ISSN: 0018-9251.

Lerro, D. et al., "Tracking With Debiased Consistent Converted Measurements Versus EKF", IEEE Transactions on Aerospace and Electronic Systems, Jul. 1993, pp. 1015-1022, No. 3, USA, XP009100975.

Julier, S. J. et al, "Unscented Filtering and Nonlinear Estimation", Proceedings of the IEEE, Mar. 2004, pp. 401-422, vol. 92, No. 3, USA, XP011108672, ISSN: 0018-9219.

Athans, M. et al., "Suboptimal State Estimation for Continuous-Time Nonlinear Systems from Discrete Noisy Measurements", IEEE Transactions on Automatic Control, Oct. 1968, One (1) page, USA, XP-002482532.

Peach, N., "Bearings—Only Tracking Using a Set of Range—Parameterised Extended Kalman Filters", IEE Proc.-Control Theory Appl., Jan. 1995, vol. 142, No. 1, XP-006003967, ISSN: 0143-7054.

Fraenken, D., "Some Results on Linear Unbiased Filtering with Polar Measurements", IEEE International Conference on Multisensor Fusion and Integration for Intelligent Systems, Sep. 3-6, 2006, pp. 297-302, Heidelberg, Germany.

* cited by examiner

METHOD FOR DETERMINING THE KINEMATIC STATE OF AN OBJECT, BY EVALUATING SENSOR MEASURED VALUES

This application is a national stage of PCT International Application No. PCT/DE2008/000088, filed Jan. 19, 2008, which claims priority under 35 U.S.C. §119 to German Patent Application No. 10 2007 007 266.1, filed Feb. 14, 2007, the entire disclosure of which is herein expressly incorporated by reference.

BACKGROUND AND SUMMARY OF THE INVENTION

The invention relates to a method for evaluating measured values generated by a sensor which makes polar measurements, and for evaluating the state of an object based thereon.

In many monitoring applications, it is necessary or useful to determine the kinematic state (that is, the position, velocity, acceleration) of an object, by the use of suitable sensors. The measurements which are provided by the respective sensors, however, are always subject to errors. In this regard, a distinction should be made between systematic error (bias) with regard to the measurement variables and a statistical error (a random discrepancy in the measurements from the measured value to be expected on average). It is well known that systematic measurement errors can be suppressed by calibration of the sensors.

One conventional method for estimating the state of an object is to record measurements by means of a sensor repeatedly in a time sequence and to accumulate this information (including the information relating to any statistical measurement uncertainty of the sensor) in conjunction with an assumption about a possible movement behavior of the object. In this way, a statement that is as accurate as possible, relating to the instantaneous state of the object, is obtained from the available information. The mean square error (that is, the average square of the discrepancy to be expected in the estimate from the true state) is generally used as a measure for the reliability of the estimate obtained in the course of this process (which is referred to as tracking). If the estimate has no systematic error (that is, it is bias-free), then the mean square error matches the estimated error variance, that is, the mean square discrepancy between the estimate and the expected value on average. (The square root of the variance, the standard deviation, is often also used instead of the variance). Otherwise, the mean square error is obtained as the sum of the estimated error variance and the square of the bias value. It is frequently also necessary to determine the addressed measures for the reliability of the estimate. However, due to the nature of the problem, this can be done only approximately since the true state of the object is in fact not known during the course of the estimation process.

With the measurements, both the estimated values for the state and the variance (which is in turn estimated) are also subject to unavoidable statistical errors. However, depending on the method that is used, a systematic error can also occur in the estimate of the state (and this despite the assumed freedom from bias in the measurements produced by the sensor). It is therefore possible, for example, for the sensor always to overestimate the range of an object as being too great, with the resulting difference between the range estimated on average and the actual range depending not only on the quality of the sensor (that is, the quality of the measurements), but also on the range (which can be determined only by the estimation method) of the object from the sensor.

Furthermore, estimation methods can be assessed as critical in which the variance as estimated by the system differs significantly from the actual mean square error. This is particularly true in the case of so-called inconsistent estimation methods (that is, when the estimated variance is considerably too small in comparison).

Tracking is therefore frequently used for the purposes of complex technical systems, to track a plurality of objects simultaneously. In this case, one core task is to associate the individual measurements with the respective objects (or to recognize that a particular measurement may be simply an incorrect measurement that does not relate to any of the objects of interest). If an inconsistent method is used in this context, and a measurement which is actually associated with the object cannot be associated with it because the estimate is assumed to be too accurate, then this generally leads to a breakdown in tracking. That is, the system cannot continuously track the object further, and therefore operates incorrectly.

Conventional sensors are used here to carry out polar measurements. That is, the measurement data they produce is expressed in terms of the range from the sensor $r_m$ and the azimuth $a_m$ (angle between north and the horizontal direction to the target, measured in the clockwise sense) Conventional estimation methods used here are intended to estimate the true Cartesian variables $x = r \sin \alpha$ and $y = r \cos \alpha$ (based on the true distance $r$ and the true azimuth $\alpha$). In this case, it is assumed that the normally distributed measurement errors are $\Delta r_m = r_m - r$ and $\Delta \alpha_m = \alpha_m - \alpha$, which have variances $\sigma^2_r$ and $\alpha^2_\alpha$.

Proposals for converting polar coordinates to Cartesian pseudo measurements are known from the prior art, including for example from Longbin, Xiaoquan, Yizu, Kang, Bar-Shalom: Unbiased converted measurements for tracking. IEEE Transactions on Aerospace and Electronic Systems vol. 34(3), July 1998, pages 1023-1027 or Miller, Drummond: Comparison of methodologies for mitigating coordinate transformation bias in target tracking. Proceedings SPIE Conference on Signal and Data Processing of Small Targets 2000, vol. 4048, July 2002, pages 414-426 or Duan, Han, Rong Li: Comments on "Unbiased converted measurements for tracking". IEEE Transactions on Aerospace and Electronic Systems, vol. 40(4), October 2004, pages 1374-1377. In these known techniques, the measurement variables are used to generate pseudo-measurements in the form $$z_m = \begin{bmatrix} x_m \\ y_m \end{bmatrix} = \beta r_m \begin{bmatrix} \sin\alpha_m \\ \cos\alpha_m \end{bmatrix} \quad (1.1)$$

and $$R_m = \begin{bmatrix} \sin\alpha_m & -\cos\alpha_m \\ \cos\alpha_m & \sin\alpha_m \end{bmatrix} \begin{bmatrix} R_m^2 & 0 \\ 0 & C_m^2 \end{bmatrix} \begin{bmatrix} \sin\alpha_m & \cos\alpha_m \\ -\cos\alpha_m & \sin\alpha_m \end{bmatrix} \quad (1.2)$$

$z_m$ being a Cartesian position measurement with an associated measurement-error variance matrix $R_m$. In these expressions, $R^2_m$ and $C^2_m$ are the variables (each dependent on $r_m$, but not on $\alpha_m$) which the method assumes as the nominal equivalent measurement-error variance in the direction of the target (the variance $R^2_m$ in the range direction) and transversely thereto (the variance $C^2_m$). Herein, $R^2_m$ is also referred to as the variance in the range direction and $C^2_m$ is referred to as the variance in the crossrange direction.

According to equation (1.1), in the known techniques the Cartesian (pseudo-) position measurement $z_m$ is obtained by conventional conversion from polar to Cartesian coordinates followed by a multiplication correction, with the scaling factor $\beta$ being intended to correct a bias which would result from the estimation process in the case where $\beta=1$. The Cartesian (pseudo-) measurement-error variance $R_m$ according to equation (1.2) defines an ellipse (over $z^T R_m z$=constant), of which one of the mutually perpendicular major axes is aligned with the measurement direction, in the same way as $z_m$ (the assumed Cartesian covariance matrix therefore rotated through the measured angle $\alpha_m$ with respect to a diagonal matrix having the major diagonal elements $R^2_m$ and $C^2_m$). The use of the variables $z_m$ and $R_m$ as a Cartesian pseudo-measurement in this case expresses the fact, for example, that a Kalman filter is used as the estimator, in an updating of the position estimate according to:

$$S = P_p + R_m, K = P_p S^{-1}, z_u = z_p + K(z_m - z_p), P_u = P_p - KSK^T \quad (1.3)$$

for estimates $z_p$ (for the position) and $P_p$ (for the associated estimated error variance) before and corresponding to $z_u$ and $P_u$, after consideration of the measurement.

Figure 1:
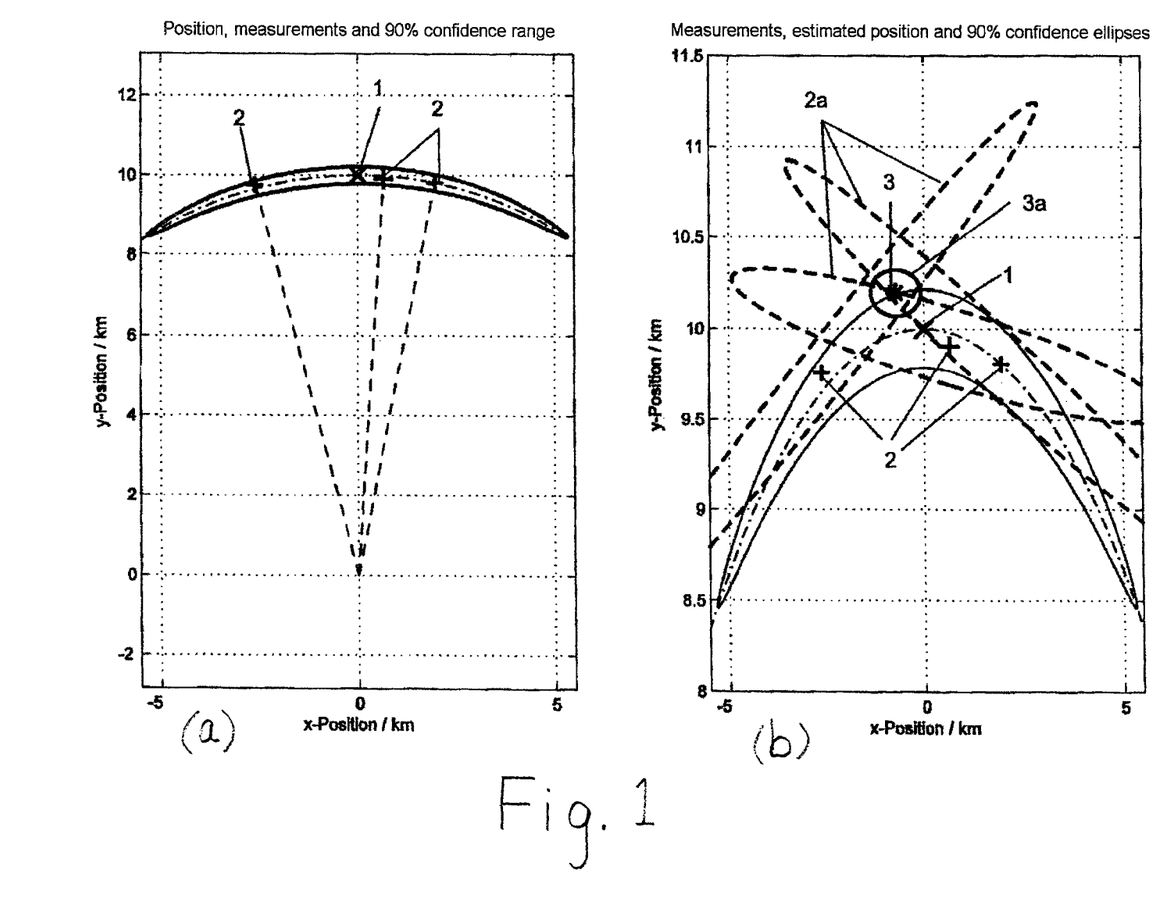

FIG. 1 illustrates the described procedure. The figure indicates the position of a stationary target 1 at a range r=10 km and an azimuth $\alpha=0°$. The solid line in FIG. 1.a is the 90% confidence region of the measurements (that is, the region in which, on average, 90% of all measurements can be expected) with a standard deviation of $\sigma_r$=50 m for the range measurement and $\sigma_\alpha$ =15° for the azimuth measurement. The illustration shows three measurements 2 with different range and azimuth errors in the form of the associated uncorrected (that is, obtained using $\beta=1$) Cartesian pseudo-measurements.

FIG. 1.b shows the situation in detail, illustrating, in addition to the pseudo-measurements 2 i) the 90% confidence ellipses 2a which are respectively associated with them and are specified by $R_m$ (that is, in each case that region in which there is a 90% probability of the targets supposedly being located, dashed lines), ii) the estimate 3 obtained and iii) the 90% confidence ellipse 3a which is associated with this estimate by the method.

The advantages of a procedure such as this over other known methods for use in technical systems for tracking a plurality of objects include i) a simple updating step, and ii) a calculation of the Cartesian pseudo-measurements requiring no knowledge whatsoever about the (estimated) state of the object. Therefore it need be carried out only once per measurement (and not, for example, once per combination of object/measurement or even object/motion model/measurement) Overall, methods such as these are therefore relatively less computation intensive, and are therefore particularly suitable for use in real-time systems.

The following are known as prior art from the literature as variants of methods which use Cartesian pseudo-measurements for the purposes of an estimation process for sensors which produce polar measurements:

Method 1 (classical):

$$\beta = 1$$

$$R^2_m = \sigma^2_r$$

$$C^2_m = r^2_m \sigma^2_\alpha \quad (1.4)$$

Method 2 (Longbin et.al. 1998):

$$\beta = 1$$

$$R^2_m = \lambda^2(\cos h(\sigma^2_\alpha)-1)(r^2_m+\sigma^2_r)+\sigma^2_r)2(\cos h(\sigma^2_\alpha)-1)r^2_m$$

$$C^2_m = \lambda^2 \sin h(\sigma^2_\alpha)(r^2 m + \sigma^2 r) \quad (1.5)$$

Method 3 (Miller & Drummond 2002, Duan et. al. 2004):

$$\beta = \lambda$$

$$R^2_m = \lambda^2((\cos h(\sigma^2_\alpha)-1)(r^2_m+\sigma^2_r)+\sigma^2_r)$$

$$C^2_m = \lambda^2 \sin h(\sigma^2_\alpha)(r^2_m+\sigma^2_r) \quad (1.6)$$

where $$\lambda = \exp(-\sigma^2_\alpha/2) \quad (1.7)$$

These methods all share the common disadvantage, however, that they lead to a systematic error (bias) in the range direction for objects which represent stationary (non-moving) targets and for targets which are not maneuvering or are scarcely maneuvering (that is, which move at an exactly or approximately constant velocity). Furthermore, none of these methods produces consistent estimates for the variance in the crossrange direction. Each of the above methods has the weaknesses mentioned above.

One object of the present invention, therefore, is to provide a method which overcomes the disadvantages of the prior art.

This and other objects and advantages are achieved by the method according to the invention, which comprises the following steps:

a sensor makes a number n>1 of polar measurements with respect to an object that is to be detected;

the polar measurements are converted to Cartesian pseudo-measurements $z_m$ by conversion of the polar measured values $r_m$ and $\alpha_m$ to Cartesian coordinates and with subsequent scaling by means of a scaling factor $\beta$ which is calculated suitably as a function of the measured range $r_m$;

associated pseudo-measurement error variance matrices are determined, each suitably comprising specific nominal measurement-error variances $R^2_m$ in the range direction and $C^2_m$ transversely thereto, as a function of the measured range $r_m$;

based on the Cartesian pseudo-measurements and the pseudo-measurement error variance matrices, an estimation device makes an estimate of the state of the object, with an estimated variance $\hat{\sigma}^2_{cross}$ being determined transversely with respect to the range direction.

In this case, the method according to the invention is distinguished by the following advantageous special features:

the scaling factor $\beta$ is chosen such that no systematic error results for a position estimate comprising n>1 measurements; and the nominal pseudo-measurement error variance $R^2_m$ in the range direction is calculated as a function of the nominal pseudo-measurement error variance $C^2_m$, transversely thereto, or conversely such that the variance $\hat{\sigma}^2_{cross}$ which is estimated after the processing of n>1 measurements, transversely with respect to the range direction, on average matches the actual variance $\hat{\sigma}^2_{cross}$ (as is to be expected after the processing of these n>1 measurements) of the estimated error transversely with respect to the range direction.

Other objects, advantages and novel features of the present invention will become apparent from the following detailed description of the invention when considered in conjunction with the accompanying drawings.

BRIEF DESCRIPTION OF THE DRAWINGS

FIGS. 1.a and 1.b show polar measurements and Cartesian pseudo-measurements with nominal measurement-error variances as well as estimates obtained therefrom with 90% confidence regions;

FIGS. 2.*a*-2.*d* show the systematic error in the direction of the object (range bias) as a function of the statistical angle measurement error for three known techniques, and for the method according to the invention; and, FIG. 3 shows the mean statistical error in the direction transverse to the object (crossrange standard deviation) as a function of the statistical angle measurement error, for three known techniques, and for the method according to the invention;

DETAILED DESCRIPTION OF THE DRAWINGS

Figure 2:
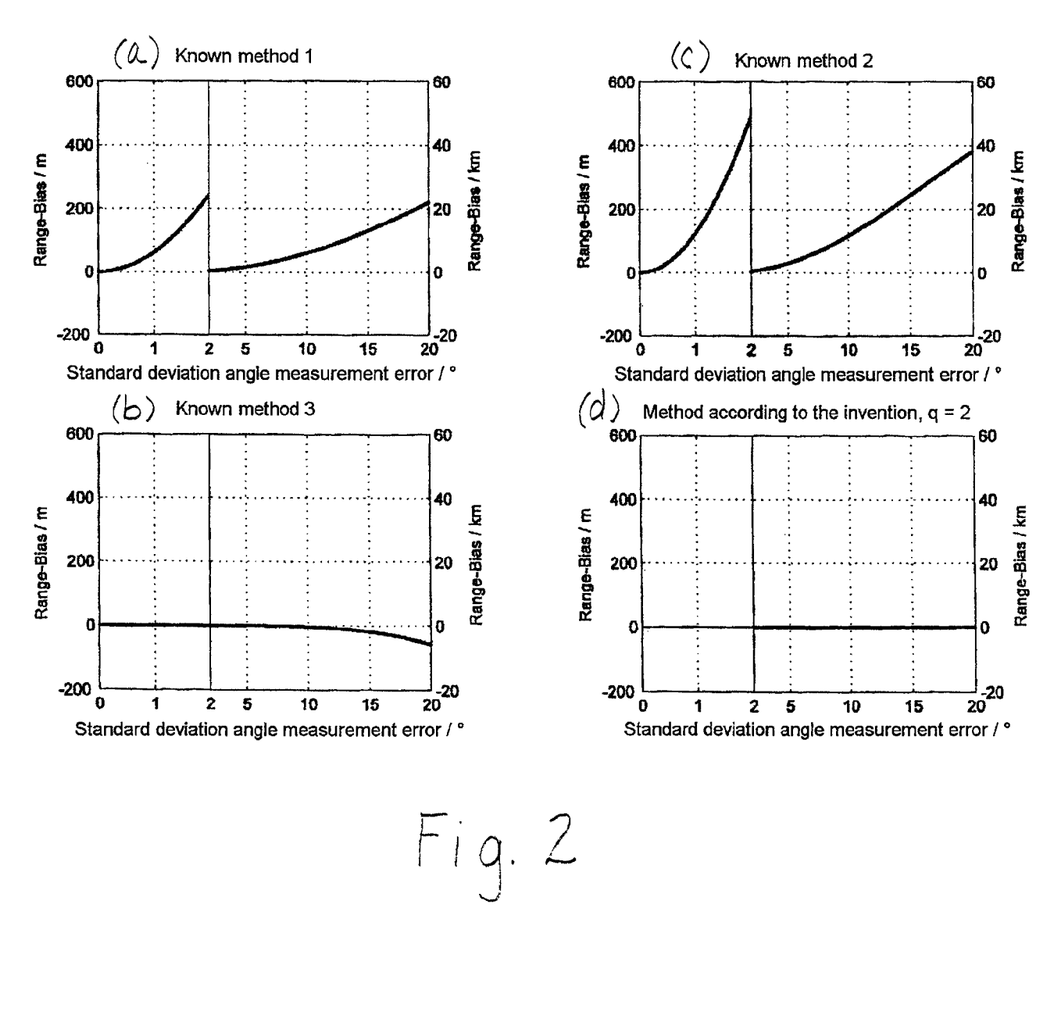
Figure 3:
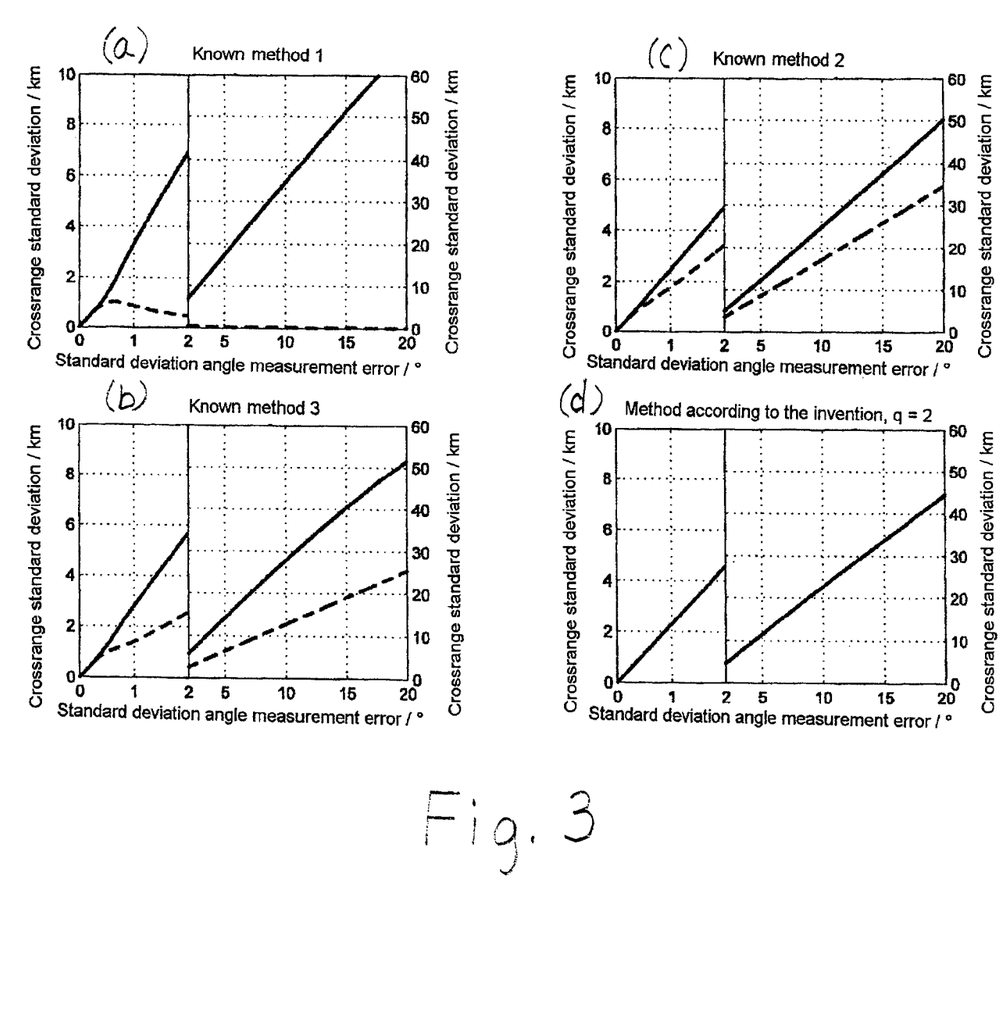

FIGS. 2 and 3 show relevant characteristic variables which the methods discussed herein have for a typical situation after processing, for example, of measurements. A stationary target at a relatively long range (r=400 km) is considered. The standard deviation of the sensor measurement error for that range was in this case assumed to be $\sigma_r$=50 m, and the standard deviation of the sensor measurement error for the azimuth $\sigma_\alpha$ is used as a parameter. The facts that the standard deviation $\sigma_r$ is considerably less than the range to be estimated, and that, for realistic values of $\sigma_\alpha$, the variance in the crossrange direction ($C^2_m$) is considerably greater than that in the range direction ($R^2_m$) can be considered to be typical in this case. (In this case, the last-mentioned statement does not, however, represent any restriction with regard to advantageous use of the invention.)

In addition to the three conventional methods known from the literature and mentioned above (FIGS. 2(*a*)-2(*c*) and FIGS. 3(*a*)-3(*c*)), FIGS. 2 and 3 show one of the methods according to the invention (FIGS. 2(*d*) and 3(*d*)) for q=2 (the meaning of the parameter q will be defined further below).

The illustration shows the expected systematic error and expected mean square estimated error in the crossrange direction, with the actual error (solid line) and the value provided by the estimation process (that is to say the estimated variance, dashed line) being compared for the estimated errors. The bias error, which is dependent on the statistical angle error, of all the conventional methods can be seen, as well as the fact that none of these methods is able to provide consistent estimates in the crossrange direction.

In contrast, the estimates using the method according to the invention (FIGS. 2(*d*) and 3(*d*)) are bias-free and consistent (dashed and solid line located one on top of one another in FIG. 3(*d*) by virtue of the design). Furthermore, the actual variance in the crossrange direction (that is, the square of the estimated error to be expected on average) is less than in the case of the known methods. In this case, it is particularly advantageous to use the method according to the invention when the range to the target from the sensor and/or the statistical error of the angle measurements are/is large.

According to the invention, the characteristic variables to be expected, comprising the bias, the estimated variance and the actual variance for estimation processes, are subjected to a systematic analysis in which Cartesian pseudo-measurements from polar measurements are used in the form (1.1) with an assumed measurement-error variance in the form of (1.2).

In contrast to all the previously known methods, however, in the method according to the invention, it is not the statistical behavior of a single Cartesian (pseudo-) measurement and the measurement-error variance associated with it that is considered, but rather the asymptotic behavior of the estimate including the variance of the estimated error and the estimated variance, which can be expected on average after processing a number n>1 of such variables in the estimation process.

This asymptotic behavior can be described to a very good approximation by analytical mathematical expressions for normally distributed sensor measurement errors with a standard deviation in the range direction which is considerably less than the range to be estimated. The factor $\beta$ for bias compensation can be determined from these expressions in the same way as the relationships between the nominal equivalent measurement-error variances $R^2_m$ and $C^2_m$, which ensure consistent estimates for the crossrange variance. In addition to depending on the characteristic variables of the sensors, all of these variables initially depend only on the range to be estimated. However, since this is not known in advance, according to the invention, the measured range is once again inserted into the analytical relationships that have been found, instead of the range to be estimated.

According to the invention, the factor $\beta$ in the equation (1.1) is expediently chosen as a function of $r_m$ to be:

$$\beta = \lambda \left[ \cosh(\sigma_\alpha^2) + \sinh(\sigma_\alpha^2) \frac{R_m^2}{C_m^2} \right] \quad (1.8)$$

This choice ensures that the estimate is free of bias in the typical situations mentioned above, for the known functional relationship of the variables $R^2_m$ and $C^2_m$ or $r_m$.

Furthermore, the estimated crossrange variance produced by the estimation process on the basis of n polar measurements becomes, according to the invention:

$$\hat{\sigma}^2_{cross} = \frac{1}{n\lambda^2 B^2} \quad (1.9)$$

where $$B^2 = \frac{\cosh(\sigma_\alpha^2)}{R_m^2} + \frac{\sinh(\sigma_\alpha^2)}{C_m^2} \quad (1.10)$$

and the actually expected cross range variance becomes:

$$\sigma^2_{cross} = \frac{Y^2}{n\lambda^2 B^4} \quad (1.11)$$

$$Y^2 = \lambda^2 \sinh(\sigma_\alpha^2)(r_m^2 + \sigma_m^2)A^4 - \quad (1.12)$$
$$\lambda^4 \sinh(2\sigma_\alpha^2)r_m^2 A^2 \left[ \frac{1}{R_m^2} - \frac{1}{C_m^2} \right] +$$
$$\frac{\lambda^8}{4} \sinh(4\sigma_\alpha^2)r_m^2 \left[ \frac{1}{R_m^2} - \frac{1}{C_m^2} \right]^2$$

$$A^2 = \frac{\sinh(\sigma_\alpha^2)}{R_m^2} + \frac{\cosh(\sigma_\alpha^2)}{C_m^2} \quad (1.13)$$

in order, finally, to calculate the variable $C^2_m$ as a function of $R^2_m$ (or vice versa) on the basis that:

$$\sigma^2_{cross} = \hat{\sigma}^2_{cross} \text{ or } Y^2 = B^2 \quad (1.14)$$

In conjunction with the stipulation (1.8), this choice ensures that the consistency of the crossrange variance estimate for a known functional dependency of the variable $R^2_n$ (and of the variable $C^2_m$) or $r_m$.

According to the invention, the variables $R^2_m$ and $C^2_m$ can advantageously be determined by predetermining a desired reference variable $\sigma^2_{ref}$ for the actual crossrange variance in the form:

$$\sigma^2_{cross} = \frac{\sigma^2_{ref}}{n\lambda^2}. \quad (1.15)$$

and then determining $R^2_m$ and $C^2_m$ by evaluation of the equations (1.9) to (1.15).

The factor $\sigma^2_{ref}$ is advantageously chosen as it is calculated from the equations (1.10) to (1.13) in conjunction with (1.15) by substituting $$R^2_m = \lambda^2((\cos h(\sigma^2_\alpha)-1)(r^2_\alpha+\alpha^2_r)+\sigma^2_r), C^2_m = \lambda^2 \sin h(\sigma^2_\alpha)(r^2_m+\sigma^2_r) \quad (1.16)$$

therein. In this case, the definition of $R^2_m$ and $C^2_m$ according to equation (1.16) is provisionally made solely with the aim of finding the suitable $\sigma^2_{ref}$ and, once this aim has been achieved, can therefore no longer be regarded as valid. If one assumes a value $\sigma^2_{ref}$ determined in this way as described in the previous paragraph (that is, the equations (1.9) to (1.15) are evaluated), then specific advantageous values for $R^2_m$ and $C^2_m$ are defined as a function of $r_m$, and will be referred to as $R^2_{ref}$ and $C^2_{ref}$.

This choice according to the invention of the values $R^2_m = R^2_{ref}$ and $C^2_m = C^2_{ref}$ defines a reference method which, although on average it has the same crossrange variance as the method known from Miller & Drummond, Duan et al. (cf. equation (1.6)), in contrast to this, however, produces bias-free and consistent estimates. In this case, the reference method is distinguished in that a minimum value $R^2_m$ for which the equations (1.9) to (1.14) always have a positive solution for $C^2_m$ is given using the value $R^2_{ref}$ in all bias-free methods with a consistent estimate of the variance transversely with respect to the range direction. In other words, the choice $\sigma^2_{ref}$ specifies a bias-free method with consistent estimation of the estimated-error variance transversely with respect to the range direction with the pseudo-measurements having a nominal variance $R^2_m$ which is as small as possible in the range direction.

Using the method according to the invention, it is also possible to reduce the crossrange variance. To this end, the nominal variance $R^2_m$ is regarded in a particularly advantageous manner to be a multiple of the variance $R^2_{ref}$ as determined above in the form $R^2_m = qR^2_{ref}$, and the variance $C^2_m$ is then once again determined from the equations (1.9) to (1.14). The real (not necessarily integer) parameter q is in this case advantageously greater than unity (the value q=1, as a limit case, actually produces the above reference method), and a typical value is q=2. However, in this case, q should not be chosen to be too large and is therefore limited at the upper end in an advantageous manner by a maximum value $q_{max}$ (for example $q_{max}=10$).

Figure 4:
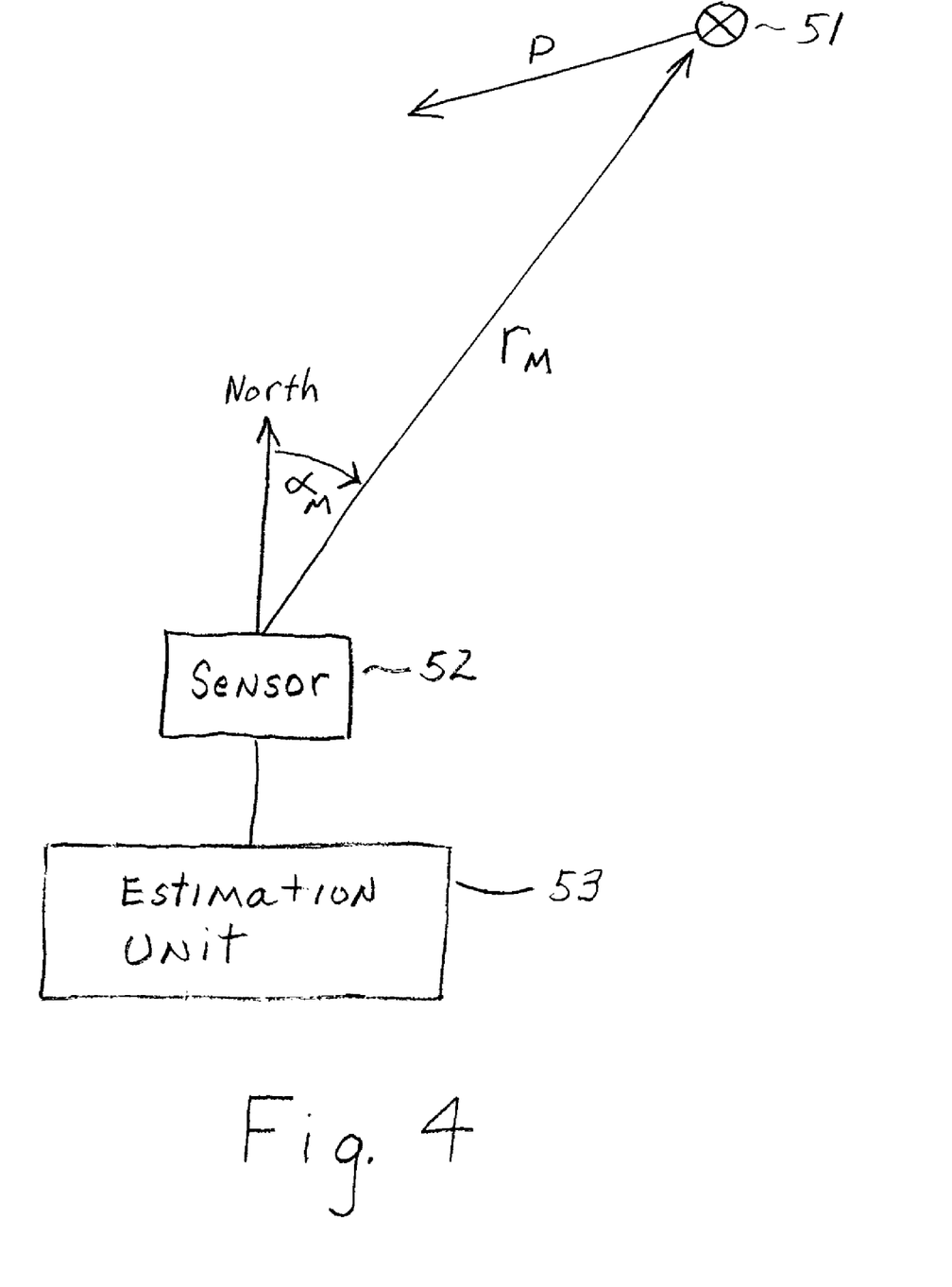
FIG. 4 is a schematic depiction of the elements of a system for performing the method according to the invention.

FIG. 4 is a schematic depiction of a system according to the invention for determining the kinematic state of an object 51, which is moving along a path P. A conventional sensor 52, provides polar measurement values for the range $r_m$ from the sensor to the object, as well as an azimuth $\alpha_m$ (the clockwise angle between north and the horizontal direction to the object). The latter values are then provided to an estimation unit 53. The polar measurement values are used to generate Cartesian pseudo measurements, and the estimation unit 53 makes an estimate of the kinematic state of the object based on the Cartesian pseudo measurements and on pseudo measurement error variance matrices, as described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for determining a kinematic state of an object, including at least one of position, velocity and acceleration of the object, said method comprising:
    a sensor making a sequence of discrete polar measurements with respect to said object, said polar measurements including as polar measurement variables, range and azimuth measurements from said sensor to said object;
    converting the polar measurements to Cartesian coordinates by conversion of the polar measurement variables range and azimuth;
    scaling the Cartesian coordinates to Cartesian pseudo-measurements using a scaling factor $\beta$ which is determined as a function of measured range;
    determining associated nominal pseudo-measurement error variance matrices, each comprising specific nominal pseudo-measurement error variances ($R^2_m$) in a range direction and transversely thereto ($C^2_m$), as a function of the measured range; and
    based on the Cartesian pseudo-measurements and the associated nominal pseudo-measurement error variance matrices, an estimation unit estimating the kinematic state of the object, with an estimated variance $\hat{\sigma}^2_{cross}$ being determined transversely with respect to the range direction; wherein,
    the scaling factor $\beta$ is determined in the estimation device such that no systematic error results for a position estimate comprising n>1 measurements; and
    the nominal pseudo-measurement error variance $R^2_m$ in the range direction is determined in the estimation device as a function of the nominal pseudo-measurement error variance $C^2_m$ transversely to the range direction, or such that the variance $\hat{\sigma}^2_{cross}$ which is estimated after the processing of n>1 measurements, transversely with respect to the range direction, on average matches the actual variance $\hat{\sigma}^2_{cross}$ of the estimated error transversely with respect to the range direction.

2. The method as claimed in claim 1, wherein:
    a desired variance of the position estimate transversely with respect to the range direction is defined by presetting a reference value $\hat{\sigma}^2_{ref}$; and
    the nominal variances are determined in the range direction ($R^2_m$) and transversely thereto ($C^2_m$) such that the estimation device on average determines position estimates with desired variances transversely with respect to the range direction, and produces matching estimates.

3. The method as claimed in claim 2, wherein a reference value $\hat{\sigma}^2_{ref}$ is determined such that a bias-free method is achieved by the associated nominal variances in the range direction ($R^2_{ref}$) and transversely thereto ($C^2_{ref}$) with a consistent estimate of the estimated error variance transversely with respect to the range direction, with minimized nominal variance of the psuedo-measurements in the range direction.

4. The method as claimed in claim 3, wherein $R^2_{ref}$ is calculated:
    in a first step, with the reference value $\hat{\sigma}^2_{ref}$ being determined such that a bias-free method is specified by the associated nominal variances in the range direction ($R^2_{ref}$) and transversely thereto ($C^2_{ref}$), with a consistent estimate of the estimated error variance transversely with respect to the range direction, and with nominal variance of the psuedo-measurements in the range direction being as small as possible; and in a second step, the reference variable $R^2_{ref}$ multiplied by a real factor q is used as the nominal variance $R^2_m$ in the range direction.

5. The method as claimed in claim 4, wherein the factor q is greater than unity.

6. The method as claimed in claim 5, wherein the factor q is limited by a value $q_{max}$.

* * * * *